United States Patent
Wang et al.

(10) Patent No.: US 10,067,616 B2
(45) Date of Patent: Sep. 4, 2018

(54) CAPACITIVE TOUCH PANEL, METHOD OF DETERMINING TOUCH POSITION AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Wenlong Wang, Beijing (CN); Tao Ma, Beijing (CN); Yinhu Huang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/810,773

(22) Filed: Jul. 28, 2015

(65) Prior Publication Data
US 2016/0266678 A1   Sep. 15, 2016

(30) Foreign Application Priority Data
Mar. 13, 2015   (CN) .......................... 2015 1 0112155

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
CPC ............................... G06F 3/044; G06F 3/0412
See application file for complete search history.

(56) References Cited

U.S. PATENT DOCUMENTS

| 2009/0096760 A1* | 4/2009 | Ma ....................... G02F 1/13338 345/174 |
| 2010/0321327 A1* | 12/2010 | Liu ..................... G02F 1/13338 345/174 |

(Continued)

FOREIGN PATENT DOCUMENTS

| CN | 101251667 A | 8/2008 |
| CN | 101739161 A | 6/2010 |
| CN | 102768604 A | 11/2012 |

OTHER PUBLICATIONS

First Chinese Office Action dated Mar. 15, 2017; Appln. No. 201510112155.9.

(Continued)

*Primary Examiner* — Amr Awad
*Assistant Examiner* — Stephen Bray
(74) *Attorney, Agent, or Firm* — Ladas & Parry LLP; Loren K. Thompson

(57) ABSTRACT

A capacitive touch panel, a method of determining touch position thereof and a display device are disclosed. The capacitive touch panel comprises a first substrate and a second substrate opposed to each other, the first substrate being provided with a black matrix. The black matrix is formed of a first metal touch electrode layer provided on a side of the first substrate away from the second substrate and a second metal touch electrode layer provided on a side of the first substrate facing the second substrate; and the first metal touch electrode layer comprises a plurality of first touch electrode lines, and the second metal touch electrode layer comprises a plurality of second touch electrode lines intersecting with the first touch electrode lines.

13 Claims, 4 Drawing Sheets

(56) References Cited

U.S. PATENT DOCUMENTS

2014/0111471 A1    4/2014  Zhao
2014/0375911 A1*  12/2014  Lee .................... G02F 1/13338
                                                                    349/12
2015/0069362 A1*   3/2015  Ito ........................ H01L 27/323
                                                                    257/40
2015/0103261 A1*   4/2015  Lee ........................ G06F 3/044
                                                                    349/12
2015/0378498 A1*  12/2015  Huie .................... G06F 3/0416
                                                                    345/174

OTHER PUBLICATIONS

The Second Chinese Office Action dated Aug. 8, 2017; Appln. 201510112155.9.

* cited by examiner

CAPACITIVE TOUCH PANEL, METHOD OF DETERMINING TOUCH POSITION AND DISPLAY DEVICE

TECHNICAL FIELD

Embodiments of the disclosure relate to a capacitive touch panel, a method of determining touch position of the capacitive touch panel, and a display device.

BACKGROUND

Touch panels are mainly classified into: an add on mode touch panel, an on cell touch mode panel, and an in cell mode touch panel. The on cell mode touch panel provides touch electrode lines between an opposed substrate of a display panel and a polarizer corresponding to the opposed substrate; the on cell mode touch panel has higher yield and will not reduce an area of a display region. The in cell mode touch panel provides the touch electrode lines inside the display panel, so that it has a reduced thickness and a reduced manufacture cost.

Further, a capacitive touch panel combining the on cell touch panel with the in cell touch panel respectively provides touch scanning lines and touch sensing lines on both sides of the opposed substrate of the display panel (for example, a liquid crystal display panel) to form a mutual capacitance at intersections of the touch scanning line and the touch sensing line which are provided in different planes. When a human body touches the touch panel, an electric field of the human body will act on the mutual capacitance, so the capacitance value of the mutual capacitance will be changed, and a position of the touch point can be determined according to the change of the mutual capacitance.

As compared with the in cell mode touch panel, the capacitive touch panel combining the in cell mode touch panel and the on cell mode touch panel has improved yield, but an overall thickness is increased.

SUMMARY

According to embodiments of the present disclosure, a capacitive touch panel is provided. The capacitive touch panel comprises a first substrate and a second substrate opposed to each other, the first substrate being provided with a black matrix. The black matrix is formed of a first metal touch electrode layer provided on a side of the first substrate away from the second substrate and a second metal touch electrode layer provided on a side of the first substrate facing the second substrate; and the first metal touch electrode layer comprises a plurality of first touch electrode lines, and the second metal touch electrode layer comprises a plurality of second touch electrode lines intersecting with the first touch electrode lines.

For example, the capacitive touch panel further comprises: a plurality of gate lines and a plurality of data lines intersecting with and insulating from each other which are provided on a side of the second substrate facing the first substrate, and thin film transistors provided at intersections of the gate lines and the data lines. Projections of the gate lines on the first substrate fall within projections of the first touch electrode lines on the first substrate, projections of the data lines on the first substrate fall within projections of the second touch electrode lines on the first substrate, and projections of the thin film transistors on the first substrate fall within the projections of the first touch electrode lines and/or within the projections of the second touch electrode lines on the first substrate.

For example, the capacitive touch panel further comprises: a plurality of gate lines and a plurality of data lines intersecting with and insulating from each other which are provided on a side of the second substrate facing the first substrate, and thin film transistors provided at intersections of the gate lines and the data lines. Projections of the date lines on the first substrate fall within projections of the first touch electrode lines on the first substrate, projections of the gate lines on the first substrate fall within projections of the second touch electrode lines on the first substrate, and projections of the thin film transistors on the first substrate fall within the projections of the first touch electrode lines and/or within the projections of the second touch electrode lines on the first substrate.

For example, the capacitive touch panel further comprises: first peripheral wirings provided on the side of the first substrate away from the second substrate and electrically connected with the first touch electrode lines, second peripheral wirings provided on the side of the first substrate facing the second substrate and electrically connected with the second touch electrode lines, and third peripheral wirings provided on the side of the second substrate facing the first substrate and electrically connected with the gate lines or the data lines. Projections of the first peripheral wirings on the first substrate fall within an projection of the second metal touch electrode layer on the first substrate, projections of the second peripheral wirings on the first substrate fall within an projection of the first metal touch electrode layer on the first substrate, and projections of the third peripheral wirings on the first substrate fall within the projections of the first metal touch electrode layer and the second metal touch electrode layer on the first substrate.

For example, the first peripheral wirings and the first touch electrode lines are provided in a same layer and made of a same material; and the second peripheral wirings and the second touch electrode lines are provided in a same layer and made of a same material.

For example, each of the first touch electrode lines is one touch scanning line, and each of the second touch electrode lines is one touch sensing line; or, each of the first touch electrode lines is one touch sensing line, and each of the second touch electrode lines is one touch scanning line.

For example, at least two adjacent first touch electrode lines form one touch scanning line, and the first touch electrode lines of one touch scanning line are electrically connected with each other via the first peripheral wirings; at least two adjacent second touch electrode lines form one touch sensing line, and the second touch electrode lines of one touch sensing line are electrically connected with each other via the second peripheral wirings; or at least two adjacent first touch electrode lines form one touch sensing line, and the first touch electrode lines of one touch sensing line are electrically connected with each other via the first peripheral wirings; at least two adjacent second touch electrode lines form one touch scanning line, and the second touch electrode lines of one touch scanning line are electrically connected with each other via the second peripheral wirings.

For example, the first substrate is an opposed substrate, and the second substrate is an array substrate; or, the first substrate is a package cover plate, and the second substrate is the array substrate.

According to the embodiments of the present disclosure, a display device is further provided. The display device comprises the capacitive touch panel as described above.

According to the embodiments of the present disclosure, a method of determining touch position of the capacitive touch panel described above is further provided. The method comprises: inputting a touch scanning signal to the first touch electrode lines; detecting voltage signals of the second touch electrode lines which are obtained by coupling the touch scanning signal by sensing capacitances; determining the touch position of the capacitive touch panel according to a change of the detected voltage signals and positions of the sensing capacitances; or, inputting the touch scanning signal to the second touch electrode lines; detecting voltage signals of the first touch electrode lines which are obtained by coupling the touch scanning signal by the sensing capacitances; and determining the touch position of the capacitive touch panel according to the change of the detected voltage signals and the positions of the sensing capacitances.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 1 is a cross-sectional view taken along A-A direction of FIG. 2a;

FIG. 1 is a cross-sectional view taken along B-B direction of FIG. 2b;

FIG. 1 is a cross-sectional view taken along C-C direction of FIG. 3.

DESCRIPTION OF THE EMBODIMENTS

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Shapes and thicknesses of respective layers in the accompanying drawings do not reflect true proportions, but only for a purpose to illustrate the present disclosure.

Figure 1:
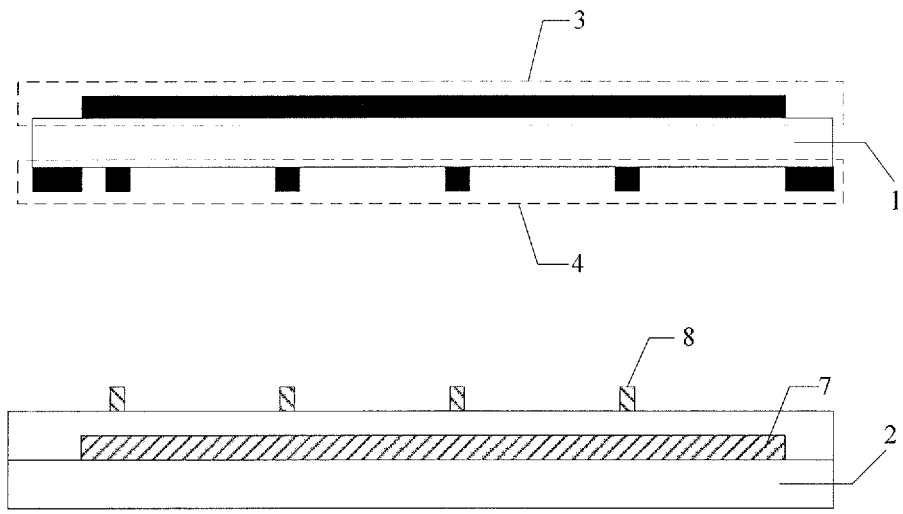
FIG. 1 is a structural schematic view illustrating a capacitive touch panel according to embodiments of the present disclosure.

Embodiments of the present disclosure provide a capacitive touch panel. As shown in FIG. 1, the capacitive touch panel comprises: a first substrate 1 and a second substrate 2 opposed to each other; the first substrate 1 is provided with a black matrix, and the black matrix is formed of a first metal touch electrode layer 3 provided on a side of the first substrate 1 away from the second substrate 2 and a second metal touch electrode layer 4 provided on a side of the first substrate 1 facing the second substrate 2. For example, the first substrate faces a user who touches the capacitive touch panel.

Figure 2A:
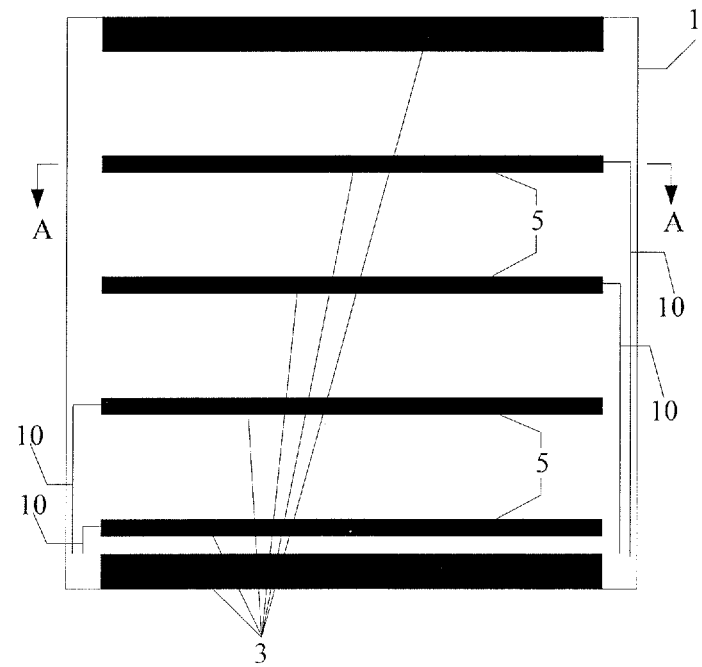
FIG. 2a is a top view illustrating first touch electrode lines of the capacitive touch panel according to the embodiments of the present disclosure.
Figure 2B:
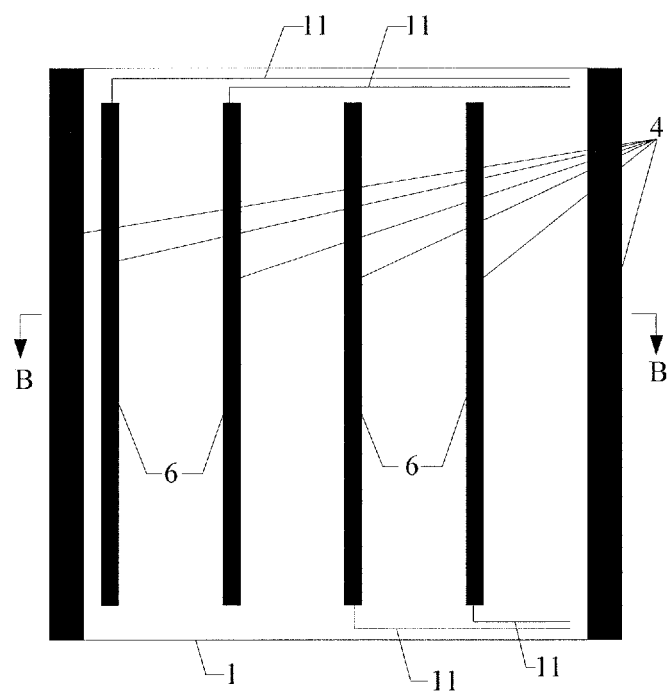
FIG. 2b is a top view illustrating second touch electrode lines of the capacitive touch panel according to the embodiments of the present disclosure.

As shown in FIG. 2a, the first metal touch electrode layer 3 comprises a plurality of first touch electrode lines 5 (as an example, FIG. 2a shows four first touch electrode lines 5); as shown in FIG. 2b, the second metal touch electrode layer 4 comprises a plurality of second touch electrode lines 6 intersecting with the first touch electrode lines 5 (as an example, FIG. 2b shows four second touch electrode lines 6).

In the capacitive touch panel according to the embodiments of the present disclosure, the first metal touch electrode layer and the second metal touch electrode layer are together used as the black matrix to shade light, and the first touch electrode lines in the first metal touch electrode layer and the second touch electrode lines in the second metal touch electrode layer further realize a touch function; that is, the first metal touch electrode layer and the second metal touch electrode layer are used as the black matrix and meanwhile realize the touch function. Therefore, as compared with a comparative capacitive touch panel in which the black matrix is specially and independently provided, the capacitive touch panel according to the embodiments of the disclosure omit the specially and independently provided black matrix, thus an overall thickness of the capacitive touch panel according to the embodiments of the disclosure is reduced.

Figure 3:
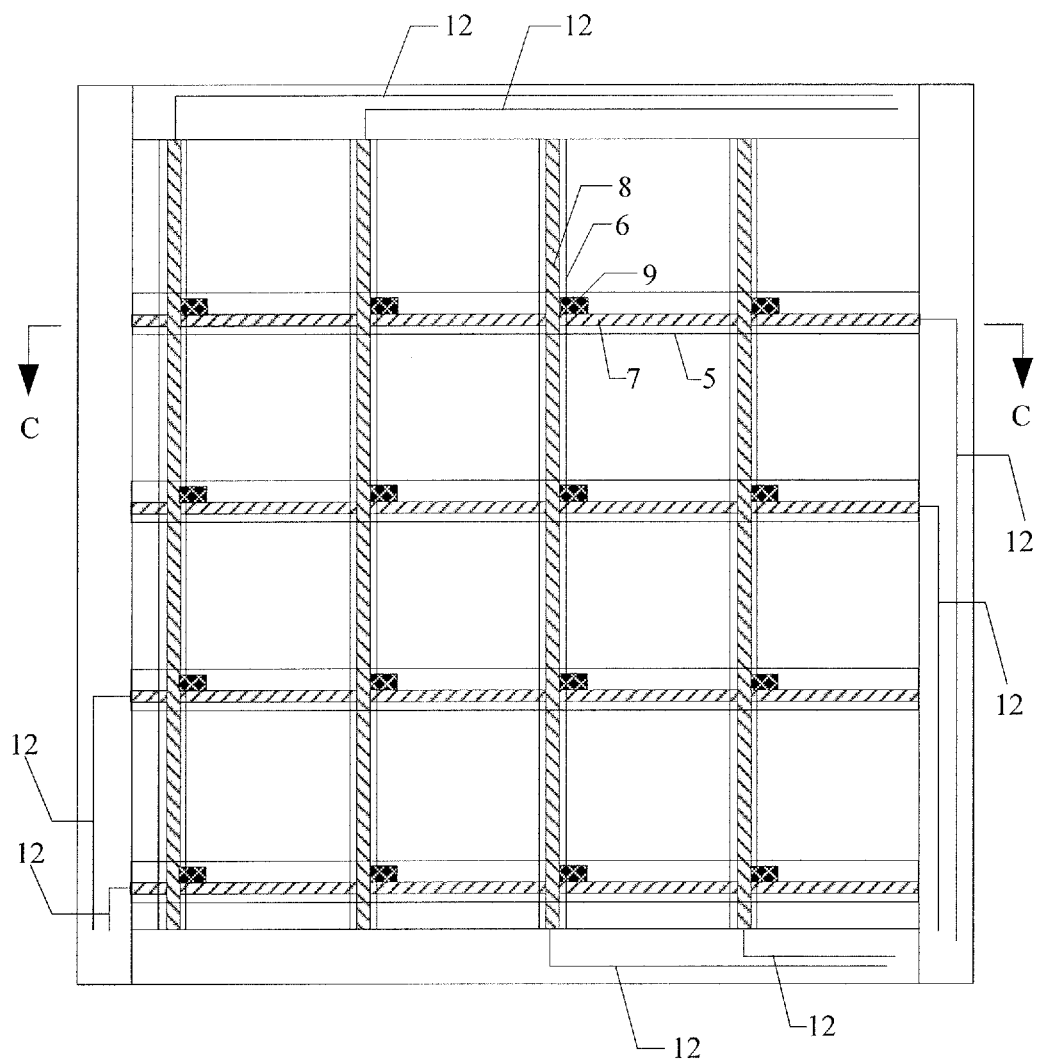
FIG. 3 is a top view illustrating the first touch electrode lines, the second touch electrode lines, gate lines, data lines and thin film transistors of the capacitive touch panel according to the embodiments of the present disclosure.

For example, as shown in FIG. 1 and FIG. 3 (in FIG. 3, in order to clearly show respective components provided on the second substrate, the first metal touch electrode layer 3 and the second metal touch electrode layer 4 filled in black in FIG. 1 are set to be filled in blank in FIG. 3), the capacitive touch panel according to the embodiments of the present disclosure further comprises: a plurality of gate lines 7 and a plurality of data lines 8 intersecting with and insulating from each other, which are provided on a side of the second substrate 2 facing the first substrate 1, and thin film transistors 9 provided at intersections of the gate lines 7 and the data lines 8; projections of the gate lines 7 on the first substrate 1 fall within projections of the first touch electrode lines 5 on the first substrate 1, projections of the data lines 8 on the first substrate 1 fall within projections of the second touch electrode lines 6 on the first substrate 1, and projections of the thin film transistors 9 on the first substrate 1 fall within the projections of the first touch electrode lines 5 and/or within the projections of the second touch electrode lines 6 on the first substrate 1 (FIG. 3 illustrate an example in which the projections of the thin film transistors 9 on the first substrate 1 fall within the projections of the first touch electrode lines 5 on the first substrate 1). In this way, the gate lines 7, the data lines 8 and the thin film transistors 9 are shaded by the black matrix formed by the first metal touch electrode layer 3 and the second metal touch electrode layer 4, thus preventing images displayed by the display panel from being affected by light leaked from the gate lines 7, the data lines 8 and the thin film transistors 9.

It should be noted that, in the capacitive touch panel according to the embodiments of the present disclosure, the structure thereof is not limited to a structure in which the first touch electrode lines correspond to the gate lines and the second touch electrode lines correspond to the data lines; and it may be a structure in which the first touch electrode lines correspond to the date lines and the second touch electrode lines correspond to the gate lines, i.e., the projections of the date lines on the first substrate fall within the projections of the first touch electrode lines on the first substrate, the projections of the gate lines on the first substrate fall within the projections of the second touch electrode lines on the first substrate, and projections of the thin film transistors on the first substrate fall within the projections of the first touch electrode lines and/or within the projections of the second touch electrode lines on the first substrate, which are not limited herein. In the description and drawings, the case in which the first touch electrode lines correspond to the gate lines and the second touch electrode lines correspond to data lines is described as an example.

The projections of the thin film transistors on the first substrate falling within the projections of the first touch electrode lines and/or within the projections of the second touch electrode lines on the first substrate comprises three cases: the projections of the thin film transistors on the first substrate only fall within the projections of the first touch electrode lines on the first substrate; or the projections of the thin film transistors on the first substrate only fall within the projections of the second touch electrode lines on the first substrate; or, the projections of the thin film transistors on the first substrate fall within both the projections of the first touch electrode lines on the first substrate and within the projections of the second touch electrode lines on the first substrate. For example, as shown in FIG. 3, the projections of the thin film transistors 9 on the first substrate 1 only fall within the projections of the first touch electrode lines 5 on the first substrate 1.

For example, as shown in FIG. 2a, FIG. 2b and FIG. 3, the capacitive touch panel according to the embodiments of the present disclosure further comprises: first peripheral wirings 10 provided on the side of the first substrate 1 away from the second substrate 2 and electrically connected with the first touch electrode lines 5, second peripheral wirings 11 provided on the side of the first substrate 1 facing the second substrate 2 and electrically connected with the second touch electrode lines 6, and third peripheral wirings 12 provided on the side of the second substrate 2 facing the first substrate 1 and electrically connected with the gate lines 7 or the data lines 8. For example, the first peripheral wirings 10 and the first touch electrode lines 5 are provided in a same layer and made of a same material. Because the first peripheral wirings 10 need to be shaded by the black matrix, projections of the first peripheral wirings 10 on the first substrate 1 fall within an projection of the second metal touch electrode layer 4 on the first substrate 1. For example, the second peripheral wirings 11 and the second touch electrode lines 6 are provided in a same layer and made of a same material. Because the second peripheral wirings 11 need to be shaded by the black matrix, projections of the second peripheral wirings 11 on the first substrate 1 fall within an projection of the first metal touch electrode layer 3 on the first substrate 1. Because the third peripheral wirings 12 are provided on the side of the second substrate 2 facing the first substrate 1 and the third peripheral wirings 12 need to be shaded by the black matrix, projections of the third peripheral wirings 12 on the first substrate 1 fall within the projections of the first metal touch electrode layer 3 and the second metal touch electrode layer 4 on the first substrate 1. In this way, the first peripheral wirings 10, the second peripheral wirings 11 and the third peripheral wirings 12 are shaded by the black matrix formed by the first metal touch electrode layer 3 and the second metal touch electrode layer 4, thus preventing images displayed by the display panel from being affected by light leaked the first peripheral wirings 10, the second peripheral wirings 11 and the third peripheral wirings 12.

It should be noted that, the projections of the third peripheral wirings on the first substrate falling within the projections of the first metal touch electrode layer and the second metal touch electrode layer on the first substrate comprises three cases: the projections of the third peripheral wirings on the first substrate entirely fall within the projection of the first metal touch electrode layer on the first substrate; or, the projections of the third peripheral wirings on the first substrate entirely fall within the projection of the second metal touch electrode layer on the first substrate; or, a portion of the projections of the third peripheral wirings on the first substrate fall within the projection of the first metal touch electrode layer on the first substrate while the other portion of the projections of the third peripheral wirings on the first substrate fall within the projection of the second metal touch electrode layer on the first substrate, which are not limited herein. For example, as shown in FIG. 3, a portion of the projections of the third peripheral wirings 12 on the first substrate 1 fall within the projection of the first metal touch electrode layer 3 on the first substrate 1 while the other portion of the projections of the third peripheral wirings 12 on the first substrate 1 fall within the projection of the second metal touch electrode layer 4 on the first substrate 1.

For example, in the above capacitive touch panel according to the embodiments of the present disclosure, each of the first touch electrode lines is set to be one touch scanning line, and each of the second touch electrode lines is set to be one touch sensing line, i.e., a touch scanning signal is input into each of the first touch electrode lines, and then the touch scanning signal is coupled and outputted by each of the second touch electrode lines. Alternatively, each of the first touch electrode lines is set to be one touch sensing line, and each of the second touch electrode lines is set to be one touch scanning line, i.e., the touch scanning signal is input into each of the second touch electrode lines, and then the touch scanning signal is coupled and outputted by each of the first touch electrode lines, which are not limited herein.

Generally, touch accuracy of the touch panel is at a millimeter order while display accuracy of the touch panel is at a micrometer scale, i.e., the touch panel needs less touch scanning lines and touch sensing lines than gate lines and data lines. In the capacitive touch panel according to the embodiments of the present disclosure, the first touch electrode lines correspond to the gate lines or the data lines while the second touch electrode lines correspond to the data lines or the gate lines, and the touch panel needs less touch scanning lines and touch sensing lines than first touch electrode lines and second touch electrode lines. Therefore, in the capacitive touch panel according to the embodiments of the present disclosure, at least two adjacent first touch electrode lines are set to be one touch scanning line, at least two adjacent second touch electrode lines are set to be one touch sensing line, the first touch electrode lines of one touch scanning line are electrically connected with each other via the first peripheral wirings, and the second touch electrode lines of one touch sensing line are electrically connected with each other via the second peripheral wirings. Alternatively, at least two adjacent first touch electrode lines are set to be one touch sensing line, at least two adjacent second touch electrode lines are set to be one touch scanning line, the first touch electrode lines of one touch sensing line are electrically connected with each other via the first peripheral wirings, and the second touch electrode lines of one touch scanning line are electrically connected with each other via the second peripheral wirings. In this way, not only touch sensitivity of the capacitive touch panel is improved, but also moiré patterns are eliminated.

For example, the capacitive touch panel according to the embodiments of the present disclosure is applicable in a Liquid Crystal Display (LCD) or an Organic Electroluminescent Display (OLED), which is not limited herein. In the case that the capacitive touch panel according to the embodiments of the present disclosure is applied in the LCD, the first substrate is an opposed substrate and the second substrate is an array substrate, structures of respective components on the first substrate are similar to those of the opposed substrate in an existing LCD, and structures of respective components on the second substrate are similar to those of the array substrate in the existing LCD, which will be not repeated here. In the case that the capacitive touch panel according to the embodiments of the present disclosure is applied in the OLED, the first substrate is a package cover plate and the second substrate is an array substrate, structures of respective components on the first substrate are similar to those of the packaging cover plate in an existing OLED, and structures of respective components on the second substrate are similar to those of the array substrate in the existing OLED, which will be not repeated here.

Embodiments of the present disclosure further provide a display device, comprising the capacitive touch panel according to the embodiments of the present disclosure. For example, the display device may be any product or part with a display function, such as a mobile phone, a tablet computer, a television, a monitor, a laptop computer, a digital photo frame, a navigator and so on.

Figure 4:
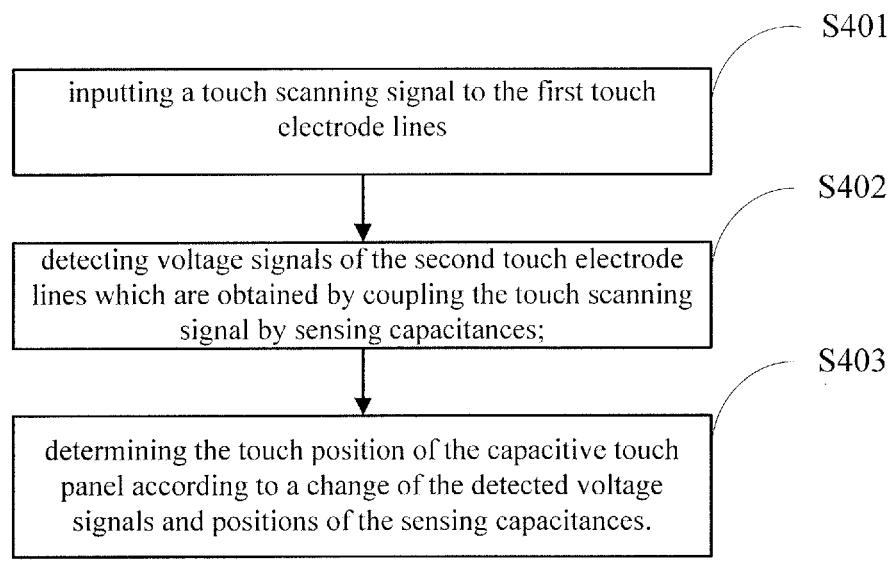
FIG. 4 and FIG. 5 respectively are flowcharts illustrating a method of determining touch position of the capacitive touch panel according to the embodiments of the present disclosure.

For the capacitive touch panel according to the embodiments of the present disclosure, the embodiments of the present disclosure further provide a method of determining touch position of the capacitive touch panel. As shown in FIG. 4, taking the case that the first touch electrode lines being the touch scanning lines and the second touch electrode lines being the touch sensing lines as an example, the method comprises steps of:

S401: inputting a touch scanning signal to the first touch electrode lines;

S402: detecting voltage signals of the second touch electrode lines which are obtained by coupling the touch scanning signal by sensing capacitances;

S403: determining the touch position of the capacitive touch panel according to a change of the detected voltage signals and positions of the sensing capacitances.

For example, the sensing capacitance is provided at the intersections of the touch scanning lines and the touch sensing lines.

Figure 5:
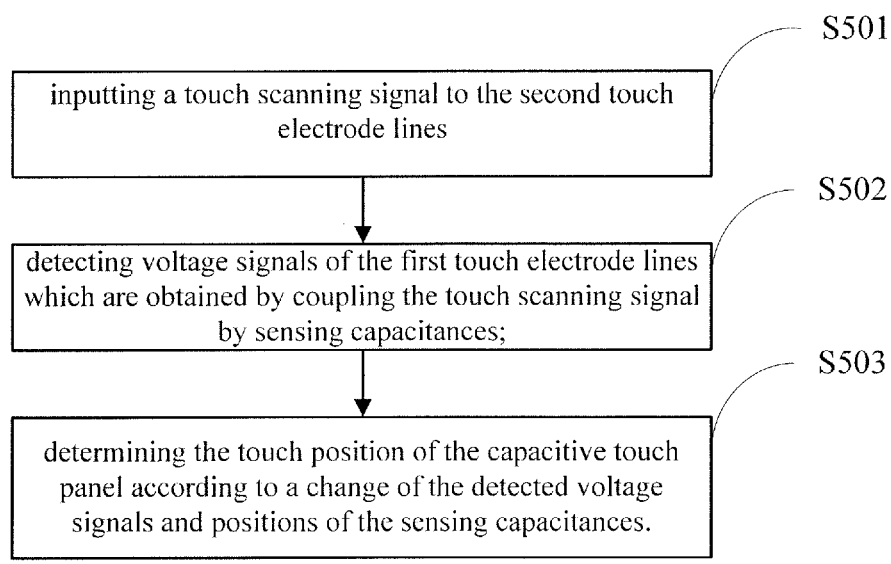

As shown in FIG. 5, taking the case that the first touch electrode lines being the touch sensing lines and the second touch electrode lines being the touch scanning lines as an example, the method comprises steps of:

S501: inputting a touch scanning signal to the second touch electrode lines;

S502: detecting voltage signals of the first touch electrode lines which are obtained by coupling the touch scanning signal by sensing capacitances;

S503: determining the touch position of the capacitive touch panel according to a change of the detected voltage signals and positions of the sensing capacitances.

For example, the sensing capacitance is provided at the intersections of the touch scanning lines and the touch sensing lines.

The embodiments of the present disclosure provide the capacitive touch panel, the method of determining touch position thereof and the display device. The capacitive touch panel comprises: the first substrate and the second substrate opposed to each other, the first substrate is provided with the black matrix, the black matrix is formed of the first metal touch electrode layer provided on the side of the first substrate away from the second substrate and the second metal touch electrode layer provided on the side of the first substrate facing the second substrate, the first metal touch electrode layer comprises a plurality of first touch electrode lines, and the second metal touch electrode layer comprises a plurality of second touch electrode lines intersecting with the first touch electrode lines. The first metal touch electrode layer and the second metal touch electrode layer are together used as the black matrix to shade light, and meanwhile the first touch electrode lines in the first metal touch electrode layer and the second touch electrode lines in the second metal touch electrode layer further realize the touch function. Therefore, as compared with the comparative capacitive touch panel in which the black matrix is specially and independently provided, the capacitive touch panel according to the embodiments of the disclosure omit the specially and independently provided black matrix, thus the overall thickness of the capacitive touch panel according to the embodiments of the disclosure is reduced.

The foregoing merely is exemplary embodiments of the disclosure, and not intended to define the scope of the disclosure, and the scope of the disclosure is determined by the appended claims.

The present application claims priority of Chinese Patent Application No. 201510112155.9 filed on Mar. 13, 2015, the disclosure of which is incorporated herein by reference in its entirety as part of the present application.

What is claimed is:

1. A capacitive touch panel, comprising: a first substrate and a second substrate opposed to each other, the first substrate being provided with a black matrix; wherein, the black matrix is formed of a first metal touch electrode layer provided on a side of the first substrate away from the second substrate and a second metal touch electrode layer provided on a side of the first substrate facing the second substrate;

the first metal touch electrode layer comprises a plurality of first touch electrode lines, and the second metal touch electrode layer comprises a plurality of second touch electrode lines intersecting with the first touch electrode lines;

the capacitive touch panel further comprises: first peripheral wirings provided on the side of the first substrate away from the second substrate and electrically connected with the first touch electrode lines, second peripheral wirings provided on the side of the first substrate facing the second substrate and electrically connected with the second touch electrode lines;

the first metal touch electrode layer further comprises two patterns respectively provided at two opposite edges of the first substrate and parallel to the plurality of first touch electrode lines, a width of each of the two patterns of the first metal touch electrode layer is larger than a width of each of the plurality of first touch electrode lines, and each of the two patterns of the first metal touch electrode layer is not connected with the first peripheral wirings; and the second metal touch electrode layer further comprises two patterns respectively provided at two opposite edges of the first substrate and parallel to the plurality of second touch electrode lines, a width of each of the two patterns of the second metal touch electrode layer is larger than a width of each of the plurality of second touch electrode lines, and each of the two patterns of the second metal touch electrode layer is not connected with the second peripheral wirings.

2. The capacitive touch panel according to claim 1, further comprising:
a plurality of gate lines and a plurality of data lines intersecting with and insulating from each other which are provided on a side of the second substrate facing the first substrate, and thin film transistors provided at intersections of the gate lines and the data lines; wherein,
projections of the gate lines on the first substrate fall within projections of the first touch electrode lines on the first substrate, projections of the data lines on the first substrate fall within projections of the second touch electrode lines on the first substrate, and projections of the thin film transistors on the first substrate fall within the projections of the first touch electrode lines and/or within the projections of the second touch electrode lines on the first substrate.

3. The capacitive touch panel according to claim 1, further comprising:
a plurality of gate lines and a plurality of data lines intersecting with and insulating from each other which are provided on a side of the second substrate facing the first substrate, and thin film transistors provided at intersections of the gate lines and the data lines; wherein,
projections of the data lines on the first substrate fall within projections of the first touch electrode lines on the first substrate, projections of the gate lines on the first substrate fall within projections of the second touch electrode lines on the first substrate, and projections of the thin film transistors on the first substrate fall within the projections of the first touch electrode lines and/or within the projections of the second touch electrode lines on the first substrate.

4. The capacitive touch panel according to claim 2, wherein,
the first peripheral wirings and the first touch electrode lines are provided in a same layer and made of a same material; and
the second peripheral wirings and the second touch electrode lines are provided in a same layer and made of a same material.

5. The capacitive touch panel according to claim 3, wherein,
the first peripheral wirings and the first touch electrode lines are provided in a same layer and made of a same material; and
the second peripheral wirings and the second touch electrode lines are provided in a same layer and made of a same material.

6. The capacitive touch panel according to claim 1, wherein,
the first substrate is an opposed substrate, and the second substrate is an array substrate; or,
the first substrate is a package cover plate, and the second substrate is the array substrate.

7. A display device, comprising the capacitive touch panel according to claim 1.

8. A method of determining touch position of the capacitive touch panel according to claim 1, comprising:
inputting a touch scanning signal to the first touch electrode lines; detecting voltage signals of the second touch electrode lines which are obtained by coupling the touch scanning signal by sensing capacitances; determining the touch position of the capacitive touch panel according to a change of the detected voltage signals and positions of the sensing capacitances; or,
inputting the touch scanning signal to the second touch electrode lines; detecting voltage signals of the first touch electrode lines which are obtained by coupling the touch scanning signal by the sensing capacitances; and determining the touch position of the capacitive touch panel according to the change of the detected voltage signals and the positions of the sensing capacitances.

9. The capacitive touch panel according to claim 2, further comprising: third peripheral wirings provided on the side of the second substrate facing the first substrate and electrically connected with the gate lines or the data lines; wherein,
projections of the first peripheral wirings on the first substrate fall within an projection of the second metal touch electrode layer on the first substrate, projections of the second peripheral wirings on the first substrate fall within an projection of the first metal touch electrode layer on the first substrate, and projections of the third peripheral wirings on the first substrate fall within the projections of the first metal touch electrode layer and the second metal touch electrode layer on the first substrate.

10. The capacitive touch panel according to claim 3, further comprising: third peripheral wirings provided on the side of the second substrate facing the first substrate and electrically connected with the gate lines or the data lines; wherein,
projections of the first peripheral wirings on the first substrate fall within an projection of the second metal touch electrode layer on the first substrate, projections of the second peripheral wirings on the first substrate fall within an projection of the first metal touch electrode layer on the first substrate, and projections of the third peripheral wirings on the first substrate fall within the projections of the first metal touch electrode layer and the second metal touch electrode layer on the first substrate.

11. The capacitive touch panel according to claim 1, wherein, at least two adjacent first touch electrode lines are electrically connected with each other via the first peripheral wirings to form one touch scanning line and at least two adjacent second touch electrode lines are electrically connected with each other via the second peripheral wirings to form one touch sensing line, or, at least two adjacent first touch electrode lines are electrically connected with each other via the first peripheral wirings to form one touch sensing line and at least two adjacent second touch electrode lines are electrically connected with each other via the second peripheral wirings to form one touch scanning line.

12. The capacitive touch panel according to claim 9, wherein, the projections of the first peripheral wirings on the first substrate fall within projections of the two patterns of the second metal touch electrode layer on the first substrate, and the projections of the second peripheral wirings on the first substrate fall within projections of the two patterns of the first metal touch electrode layer on the first substrate.

13. The capacitive touch panel according to claim 10, wherein, the projections of the first peripheral wirings on the first substrate fall within projections of the two patterns of the second metal touch electrode layer on the first substrate, and the projections of the second peripheral wirings on the first substrate fall within projections of the two patterns of the first metal touch electrode layer on the first substrate.

* * * * *